Aug. 4, 1931.  C. A. DUNSETH  1,817,678
MEAT CUTTING DEVICE
Filed March 7, 1927  2 Sheets-Sheet 2
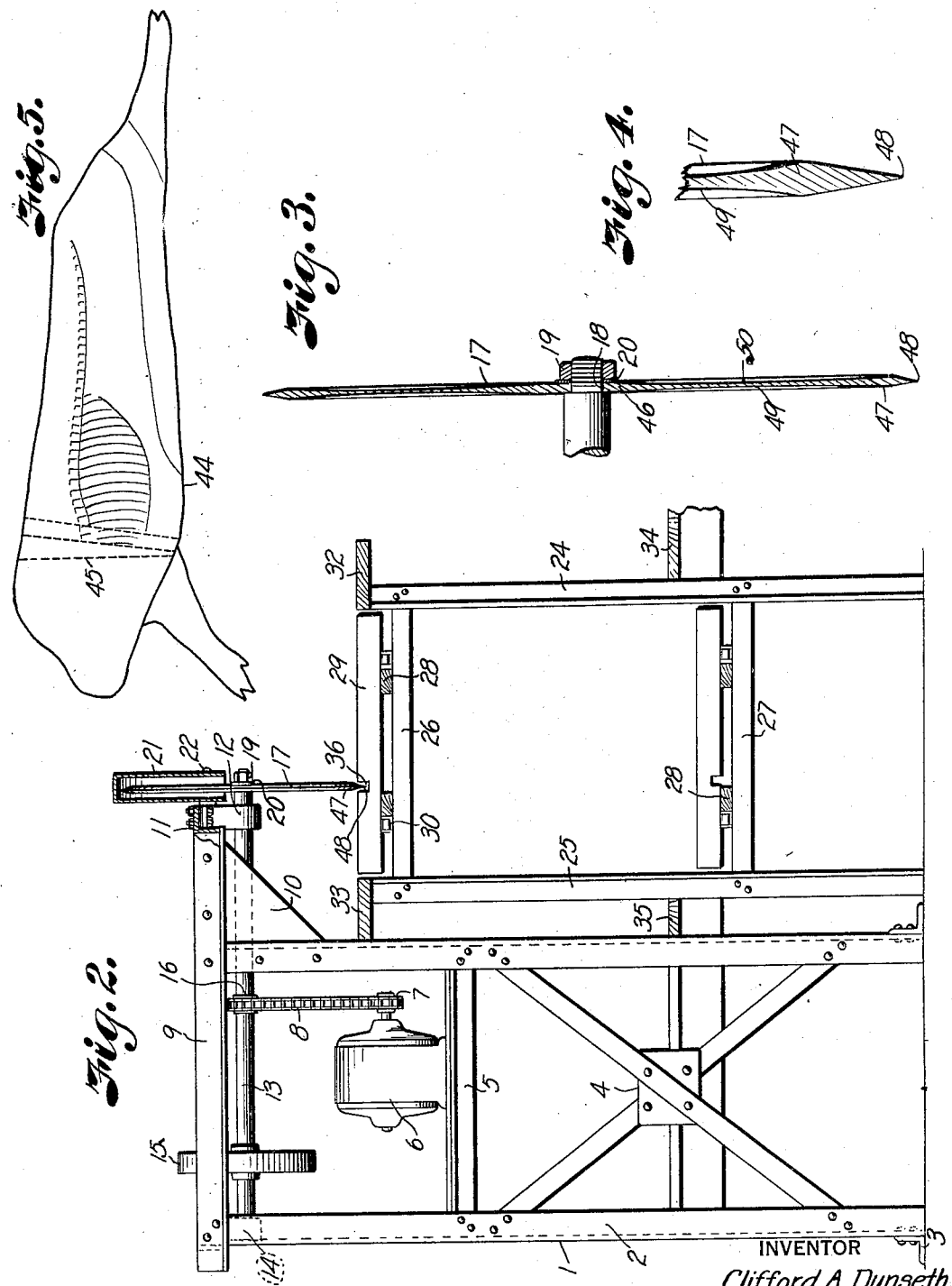
INVENTOR
Clifford A. Dunseth
BY
ATTORNEY Patented Aug. 4, 1931

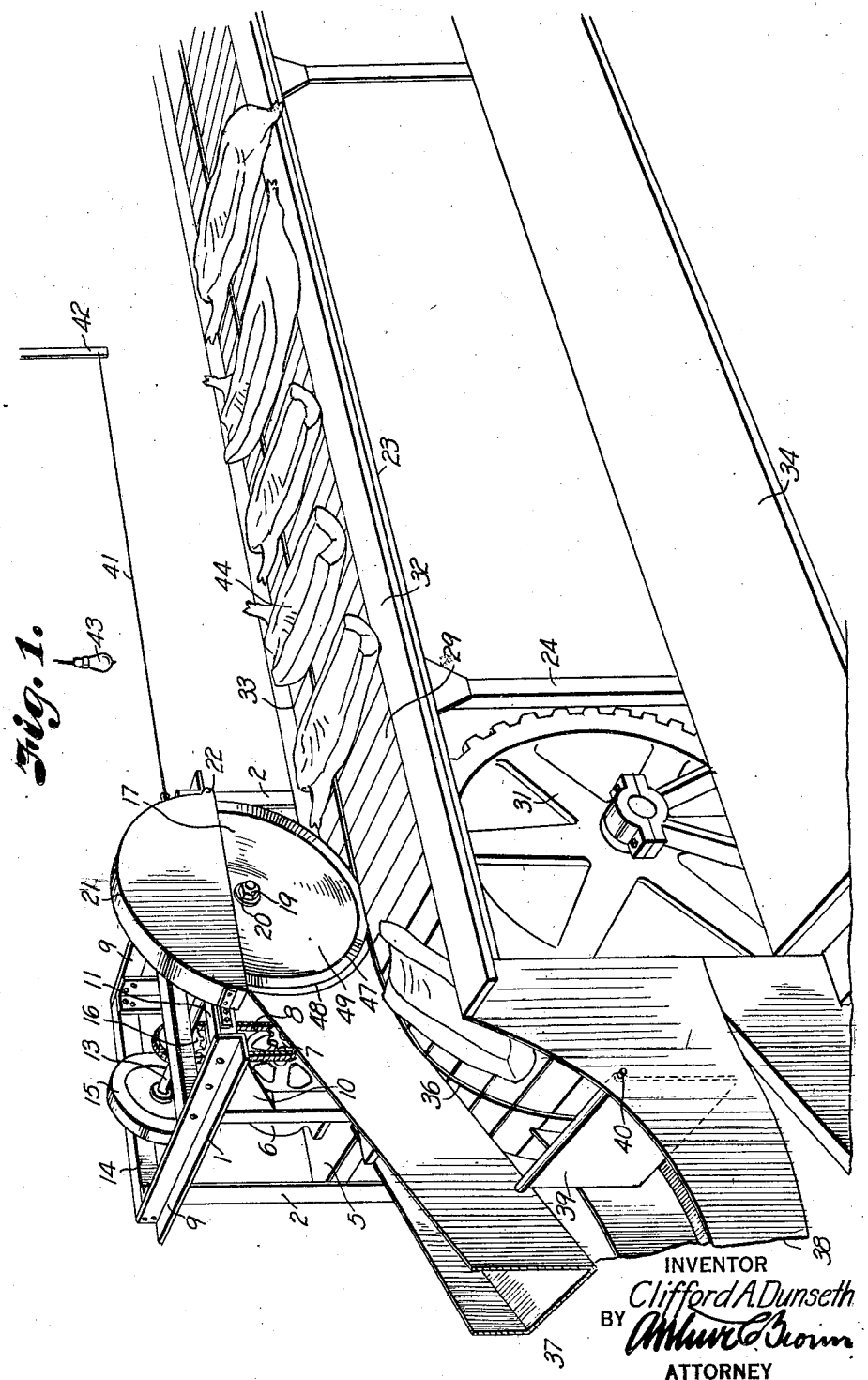

1,817,678

UNITED STATES PATENT OFFICE

CLIFFORD A. DUNSETH, OF KANSAS CITY, MISSOURI

MEAT CUTTING DEVICE

Application filed March 7, 1927. Serial No. 173,441.

My invention relates to devices for severing carcasses and more particularly to devices for use in hog cutting operations.

My object is to provide a machine having a suitable cutting element, whereby the parts of a carcass may be severed from other parts more economically and expeditiously than with present devices, with less injury to the meat, and less hazard to equipment and operators. I also purpose to provide features whereby the cutting operations may be performed more accurately and whereby the placement of parts for cutting may be promptly effected.

I provide a machine having novel details of structure to accomplish my purpose, which has not been attained heretofore.

The problems which I have sought to solve concern primarily the severing of the shoulder part from the partial carcass of the hog in the course of the translation of such partial carcass on a conveyor while being subjected to various cutting operations by a number of operators. At one point in this process and at a location adjacent the discharge end of the conveyor the shoulder is severed, an operation that heretofore has been performed by a workman with a heavy cleaver, the portion being manually deposited on a block to receive the cut. The rapidity with which the work must be done and the requirement of assistance of one or more helpers to arrange the portion of carcass, produce a situation in which hazard of injury to the assistants, or of a mis-cut on the meat, arises. My invention overcomes this part of the problem, as will be shown.

Another disadvantage in previous practice has been the amount of time consumed in the placing and cutting of the portion of carcass, which slows up the entire process. Similar machines have not been used in the severing of the shoulder from the disposed portion. Machines of the general description of my device have, however, been used in packing houses but only for the cutting of sides from which the bones have been removed. Such machines, however, use a disk knife that, because of its structure, tends to sear and contort the meat, producing a condition undesirable for marketing and of reduced keeping quality. Machines referred to have not been applied to shoulder cutting or to any other operation requiring the severing of bone. My improvements and novel features, therefore, may adapt said machines to such uses and also provide the elements that overcome objections to the use of rotating knives for severing parts of carcasses.

Further advantages of my device and the details thereof will be described with reference to the drawings in which:

Fig. 1 is a perspective view of my device associated with a traveling table or conveyor.

Fig. 2 is an elevational end view of the device, and a cross section through the cutting element and conveyor.

Fig. 3 is a section through the disk knife.

Fig. 4 is an enlarged detail view of the cutting edge of the knife illustrating the reinforced rib portion and the annular concave recess.

Fig. 5 is a side view of a carcass portion, illustrating shoulder cuts to be made by my device.

Referring in detail to the drawings:

1 designates the frame of the device comprising pedestal legs 2 of which there are four in the machine described, fixed to the floor of the packing house room by angle bars 3 and braced by means designated as 4. A platform 5 supported by the frame carries a motor 6 having a sprocket 7 rotating a chain 8 by which the device is actuated.

Cross members 9 fixed on the top of the frame element and projecting laterally beyond the frame, braced by gusset plates 10, support terminally the bearing bar 11 carrying the exterior bearing 12 in which the shaft 13 is rotatably borne, the other end of the shaft being journalled in a bar 14 supported by the frame and parallel with said bearing support bar 11. The shaft carries a fly wheel 15 adjacent its end journalled in the bar 14, and sprockets 16 with which the chain 8 is engaged for rotation of the shaft by the motor.

A knife or cutting disk 17 is provided of a special character that will be described, having an axial orifice 18, and is slipped on the reduced threaded end of the shaft 13 and securely fixed thereto by a nut 19, a washer 20 being inserted between the nut and the disk.

A cover or guard 21 is pivoted at 22 to the projecting end of the cross member 9 to depend over the upper part of the disk as a safety element, and restrain particles that may be carried and centrifugally discharged by the disk and also to capture parts of the disk in case it should be broken in the operation.

The machine as described is designed for use primarily in connection with a rolling conveyor assembly generically designated 23 for a series of cutting operations and comprising the two sets of supporting posts designated respectively 24 and 25 having the upper and lower cross braces 26 and 27 on which are longitudinal stringers 28 slidably supporting the conveyor 29 comprised of slats and constituting a flexible moving track. The rolling platform or track is moved by the chain indicated by 30 attached to the slats, the chain being actuated in the usual manner by mechanism indicated by the numeral 31 applied to a gear that is understood to be actuated from a power source not shown, the track deflected downward at the end of the assembly for engaging said circular gear element. On each side of the conveyor assembly, and longitudinally thereof, are shelves 32 and 33 laid on the tops of the posts 25 and 24, the horizontal level of the rollers being in the plane of the shelves. Platforms 34 and 35 are provided for the workmen for convenient elevation for access to the table so that two facing groups standing side by side on the platforms successively confer the desired cuts on the carcasses and parts of carcasses being translated by the conveyor.

A groove 36 is provided longitudinally of the rolling conveyor and at such lateral position as may be suitable for the cutting operations to be accomplished by the groups. Grooved chutes designated respectively 37 and 38 are provided, one related to a section of the conveyor on each side of the groove, to receive the parts severed by the disk knife 17 which is arranged so that its edge projects into the said groove. The chute 38 is shown as provided with the shutter or flapper 39 pivoted in the sides of the chute at 40, the shutter depending, the purpose of which is to prevent the relatively long cut of meat from departing from the position which it should normally maintain in dropping over the downwardly directed portion of the conveyor into the lower level of the chute for transfer to another section of the cutting room.

I wish to refer now to a particular problem which I solve. In packing house practice it has been found convenient and most economical to arrange that two groups of workmen are disposed opposite each other at a table along which parts of carcasses are being transferred, hence a relatively large number of operations on the parts can be accomplished in a short time and while the parts are passing. Most of the said operations can be performed with relative ease irrespective of the length of the carcass or parts thereof arranged on the conveyor. The reason that heretofore machines have not been used to perform the heavy operations of cutting the shoulder from the back and belly of the part of the carcass carried on the particular conveyor is that necessary bearing provision for a rotary knife has tended to interfere with and retard the work of men positioned at the table. A machine that would handle carcasses of various lengths would require the provision of a conveyor table of such extreme width as to render difficult the work of the other men, either by requiring them to lean too far over the table to confer the cut involved in their particular tasks, or by requiring the shifting of the carcass with frequency from one side of the conveyor to the other. One factor involved is the space occupied on both sides of the table by the bearing supports, in former practice.

My device providing the disk positioned on the projecting end of overhanging bearings accomplishes an arrangement whereby the work of no operator is interfered with and a table of normal width maybe used.

My device also makes it possible to eliminate a large proportion of manual labor involved in positioning the pieces for cutting, and assures accuracy in the conferring of the cut as well as eliminating the dangers previously referred to. The operator who, in the particular instance with my device, cuts the shoulder from the back and belly, stands near the knife and can closely observe his materials, and by a minimum of effort can shift the object into a position where the disk rotating in the groove, will cut the advancing object exactly on the line designated. A means of gaging the operation and of guiding the installation into such relation with parts that the disk will follow a prescribed line of cleavage, is indicated by the cord 41 fixed above the table, one end attached to the frame and one to a depending arm 42 suitably fixed in a part of the building, and a light 43 so suspended that its beams will cause a shadow to be cast by the cord longitudinally in the groove of the table and, therefore, upon the object disposed on the conveyor. The cord can be so arranged that it will not interfere with an operator.

The workman who disposes the carcass for receiving the cut by the disk, having instructions either specific or general, may draw the carcass transversely of the conveyor to the desired position to cut more or less of the shoulder and he may dispose the part angularly on the conveyor for a similar purpose. Fig. 5 illustrates the headless portion of carcass 44 that is subjected to operation by a conveyor in the processes being used for illustration. The dotted lines 45 suggest three of the variations in cutting which may be complied with by the operator to cut off with the shoulder more or less of the more valuable parts of the hog as instructions may have demanded.

Such result can be attained economically and efficiently because of the means provided for disposing the parts and for applying the cutting element, and the nature of the cutting element itself which is an important factor. The rotary knife or disk is provided as having a hub 46 and a rim 47 of practically equal thickness, the rim having the circular symmetrically beveled cutting edge 48. The web or larger part of the disk is designated 49, is substantially thinner than the hub and rim, and is formed with annular curved recesses in each face, the preferably uniformly concave surfaces producing the thinnest annular portion of the blade equi-distant from the rim portion and the hub and designated 50.

Because of this structure only a small extent of the knife comes into pressure contact with the flesh being cut thereby. After the edge and rim have effected the cut and continue rotating, a major portion of the disk is in relatively slight contact with the separated surfaces of the flesh. This condition contrasts with the condition in the use of an ordinary disk knife, in the latter case the surfaces of the disk having sufficient continuously exerted frictional contact with the flesh to heat and sear the same and even to mangle it, rendering it not only unsightly but less fit to eat and subject to deterioration.

Another advantage of the disk structure shown appears in case of breakage. A disk of the kind illustrated is likely to break on lines enclosed by the boundaries of the recessed part adjacent and at the annular line 50 so that the hub will remain attached to the shaft, only portions of the wheel departing under centrifugal influence. The provision of the guard indicated, tends to assure the retention of such flying parts. In case of breakage therefore, the parts can be quickly found and recovered, the hub of the broken disk can be removed and a new disk substituted. The position of the disk on the projecting end of the shaft carried by overhanding bearings also facilitates the removal and installation of a disk in resharpening or other replacement incidents.

This is an important consideration since with my device a few minutes would suffice to replace a disk, while an hour or more, costing say $100.00 in labor and delayed production, might be necessary for replacing a cutting member in a machine as heretofore provided.

Another important advantage of my device is the economy provided for in the useful life of a disk. I probably will make the bearings of the shaft supporting a disk vertically adjustable by shims under the bearings. The structure of a disk is such that it may be resharpened repeatedly until a considerable part of the rim has been removed and the cutting edge portion 47 encroaches on the recessed portion 49.

The concavely recessed nature of the web enables it to offer its thicker outer portion for service as a rim portion. The disk may be vertically adjusted to effective position with reference to the carrier by rearrangement of adjustable bearings.

Two features of my device are particularly useful for the cutting of parts containing bones. The provision of the recessed portion of the disk, that is, the thin web portion, confers a substantial amount of resiliency and elasticity on the cutting knife so that it will give slightly upon encountering a particularly tough, brittle or resistant bone or portion of bone, and is, therefore, less liable to breakage and offers assurance of continuous cutting. The overhanging bearing also contributes to such advantage since a small but important degree of retreat is possible for the shaft under the resistance of a suddenly encountered obstacle, as contrasted with the unyielding nature of an arrangement involving a shaft rigidly mounted between its bearings.

While I have described my device as usable particularly in cutting off the shoulder from a portion of carcass, it is also useful for splitting the side, that is, for separating the back from the belly, since the accuracy provided for is equally desirable in the alternative situation and the necessity for retrimming will be eliminated, such retrimming being sometimes required with the use of rotary knives because of the searing and mangling effect produced through the excessive frictional contact of the web of the disk with the meat. While the mangling is only of minute particles of the surface cut, it produces a slick or abnormal condition and appearance that, as stated, is both undesirable and sanitarily objectionable.

It is obvious that a saw or other severing element may be installed as equivalent to the knife I describe.

I wish to state that machines exemplifying the principles here outlined have been set up and are in use in packing plants, the plans whereof have been provided by me and proper recognition made by the user of my origination of the principles represented in the structure. None of the means exemplifying my invention referred to has been installed longer than eighteen months prior to the date of this application.

What I claim and desire to secure by Letters Patent is:

1. In apparatus of the character described, a conveyor table comprising fixed spaced shelves and a conveyor movable between the shelves for moving a carcass over the surfaces of the shelves, a frame erected at one side of the table and at the delivery end of the conveyor, a severing member, and overhanging bearings mounted on the frame for supporting the severing member over the conveyor to act on the carcass.

2. In apparatus of the character described, a table including longitudinal parallel spaced shelves, a conveyor movable longitudinally of the table between the shelves and in the plane thereof for translating carcasses along the table, a frame independent of the table spaced laterally therefrom at the delivery end of the conveyor, and a rotatable cutting disk supported by the frame above the conveyor.

3. In apparatus of the character described, a support including spaced posts, a conveyor for moving carcasses comprising slats forming an endless belt, means including cross bars on the posts adapted to support the upper run of the conveyor in horizontal position, fixed shelves mounted on the posts on each side of the conveyor forming a table in the plane of the upper run thereof for supporting portions of a carcass being moved by the conveyor, and means including a frame spaced laterally from the table and a cutting disk supported by the frame above the delivery end of the conveyor for severing the carcass.

4. In apparatus of the character described, a cutting table comprising spaced posts and parallel shelves mounted on the posts in spaced relation to admit a conveyor therebetween, a conveyor comprising slats forming an endless belt, means on the posts for supporting the upper run of the conveyor in the plane of the shelves, a frame including laterally spaced posts spaced laterally from the table, a bearing mounted on the frame between said posts, an overhanging bearing supported by the frame above the conveyor, a shaft rotatable in said bearings, a cutting disk mounted on the end of the shaft for operating on carcasses translated by the conveyor along the table, and means supported by the frame for operating the shaft, said frame being located adjacent the delivery end of the conveyor.

In testimony whereof I affix my signature.

CLIFFORD A. DUNSETH.